United States Patent [19]

Wiegand

[11] 3,818,465

[45] June 18, 1974

[54] TRAVELING MAGNETIC DOMAIN WALL DEVICE

[75] Inventor: John R. Wiegand, Long Island, N.Y.

[73] Assignees: Milton Velsinsky, Plainfield, N.J.; John R. Wiegand, Valley Stream, N.Y.

[22] Filed: July 7, 1972

[21] Appl. No.: 269,525

Related U.S. Application Data

[63] Continuation-in-part of Ser. No. 52,571, July 6, 1970, abandoned.

[52] U.S. Cl.340/174 ZB, 340/174 BC, 340/174 PW, 340/174 VC

[51] Int. Cl. .............................................. G11c 11/04

[58] Field of Search ..............340/174 PW, 174 BC, 340/174 VC, 174 ZB

[56] References Cited

UNITED STATES PATENTS

| | | | |
|---|---|---|---|
| 3,134,096 | 5/1964 | Bartkus et al. | 340/174 PM |
| 3,428,955 | 2/1969 | Oshima et al. | 340/174 PW |
| 3,531,782 | 9/1970 | Turczyn | 340/174 BC |
| 3,757,754 | 9/1973 | Wiegand | 123/148 E |

*Primary Examiner*—James W. Moffitt

*Attorney, Agent, or Firm*—Ryder, McAulay, Fields, Fisher & Goldstein

[57] ABSTRACT

A magnetic device which permits the relocation of one or more magnetic domain walls is disclosed. The device includes a first magnetic domain and a second magnetic domain having a coercivity substantially less than the first domain. The dimensions of the device are such that upon terminating exposure of both domains to a magnetic field, the first domain has a net magnetization in a first direction, a portion of the second domain has a net magnetization in a direction opposite from the first direction and the remainder of the second domain has a net magnetization in said first direction and is separated from said portion by a domain wall.

20 Claims, 11 Drawing Figures

TRAVELING MAGNETIC DOMAIN WALL DEVICE

BACKGROUND OF THE INVENTION

This is a continuation-in-part of U.S. Pat. application Ser. No. 52,571 filed July 6, 1970 entitled "Traveling Magnetic Domain Wall Device", and now abandoned.

This invention relates to magnetic information handling circuits and, more particularly, to a new device for shifting a magnetic domain wall along a magnetic medium.

Magnetic devices utilizing a domain wall concept are known in the art. Such devices comprise a magnetic medium in which a reverse magnetized domain is introduced by a magnetic field. The device is operated by initializing the magnetic medium to a first direction of magnetization and, thereafter, selectively reversing a portion of the medium to a second direction of magnetization forming a reverse domain. The domain walls which define the periphery of the reversed portion could then be propagated down the magnetic medium through sequential steps by the successive application of an external magnetic field, mechanically or by separate switching means through electronic gear. A detector coupled to the output position indicates binary one and binary zero values corresponding to the presence and absence of domains, respectively, in the proper time slots.

Because of the capability of sequential stepping, these devices have found use as in magnetic shift registers, logical gating circuits and coincident memories.

OBJECTIVES

It is an objective of this invention to provide a magnetic device through which a domain wall can be propagated with minimal input energy and which provides an output signal of such substantial magnitude as to be readily usable.

Another objective of this invention is to provide a traveling magnetic domain wall device which may be manufactured and handled easily and inexpensively and which requires simple electronic auxilliary apparatus to utilize the information contained in the device.

A further objective of this invention is to provide a traveling magnetic domain wall device which avoids the need to use critical and carefully controlled energy levels to form and propagate the domain wall.

BRIEF DESCRIPTION OF THE INVENTION

Briefly stated, this invention, in one form, provides a device formed of a magnetic material which is processed to form a magnetic device having two states or domains, preferably in the form of a wire. In the preferred form, the two domains comprise a core which is relatively magnetically "soft" (the core has a relatively low coercivity) and a shell surrounding the core which is relatively magnetically "hard" (the shell has a relatively high coercivity). The result is a magnetic device having two domains (core and shell) in which the direction of magnetization of the core can be reversed in sequential steps at a high rate to provide, in an adjacent pick up coil, an electrical pulse that has a high signal-to-noise ratio. This two domain wire can be prepared by twisting a ferromagnetic wire back and forth about its axis. The consequentially greater straining of the circumference than of the core work hardens the circumference to form a relatively magnetically "hard" shell and "soft" core.

An electrically conductive wire is coiled around the magnetic device throughout its length. When a charging electrical current of at least a certain predetermined magnitude is passed through the coil in one direction, a magnetic field is generated which magnetizes the entire device (core and shell) in a first axial direction. When the magnetizing field is removed (current terminated) the entire shell remains magnetized in the first axial direction. However, a short portion of the core extending inwardly from each end is magnetized in the opposite direction. This is due to the demagnetization field at the ends of the core and shell which tends to reverse the direction of magnetization of the core and shell. The low coercivity of the core allows a portion of the core to become reversed while the high coercivity of the shell prevents the shell from having its direction of magnetization reversed. These short portions terminate at a domain wall transverse to the axis of the wire. A cylindrical longitudinal domain wall is formed around the short portion of the core between the transverse domain wall and the end of the magnetic device.

The transverse domain walls at each end of the device (wire) can be moved in a stepped progression toward the middle of the wire by passing current pulses of a magnitude less than the "charging" current and in an opposite direction through the coil. The distance that the domain walls move for each pulse is a function of the pulse voltage, the duration of each pulse and the diameter of the magnetic device. Movement of the transverse domain wall actually is an increase in the length of the portion of the core which is magnetized in the direction opposite to the direction of magnetization of the shell. As each step in the propagation of the domain wall occurs, the magnetic field immediately surrounding that portion of the magnetic device where the new position of the transverse domain wall is established changes rapidly. A pick up coil located in that area will have an electrical pulse induced therein which pulse can then be used for any desired purpose.

BRIEF DESCRIPTION OF THE DRAWINGS

The above and other objectives and attendant advantages of this invention will become apparent from the following description taken together with the accompanying drawings in which.

DETAILED DESCRIPTION

Figure 1:
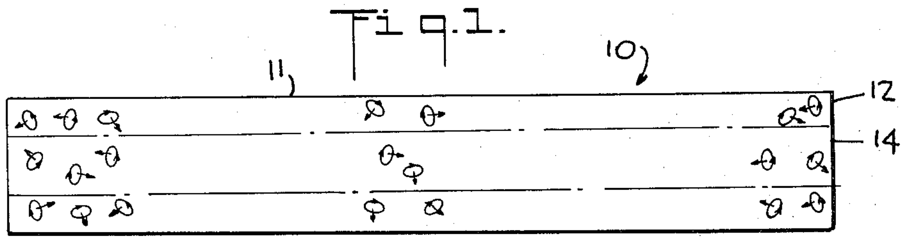
FIG. 1 is a schematic representation of a two domain magnetic device formed in accordance with this invention, and being in an unmagnetized state.
Figure 2:
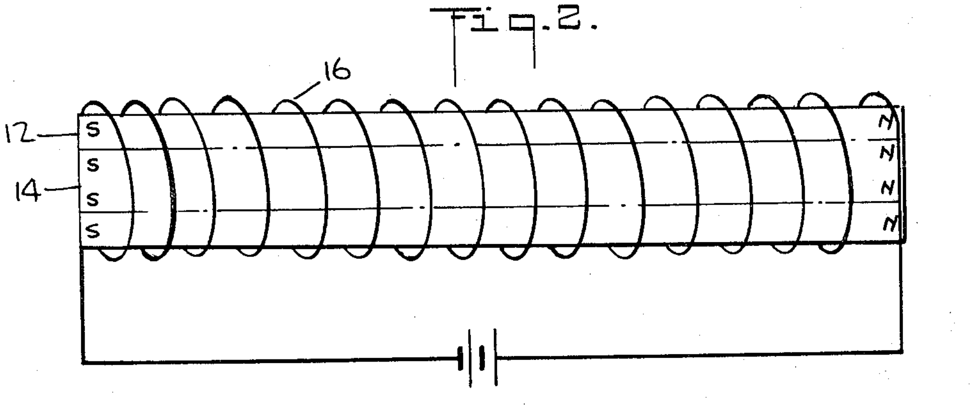
FIG. 2 shows the two domain magnetic device of FIG. 1 in a fully "charged" state.
Figure 3:
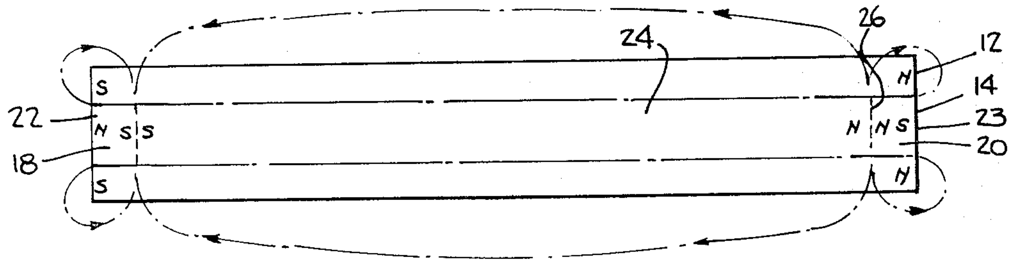
FIG. 3 is a schematic representation of the two domain magnetic device of FIG. 1 after the charging magnetic field is removed and transverse domain walls are formed.

Formation and Propagation of a Transverse Domain Wall (FIGS. 1 – 3)

It has been discovered that a wire of a suitable ferromagnetic material having a generally uniform composition and, for example, formed by a drawing process may be treated to form a magnetic central portion (hereinafter referred to as a core) and a magnetic outer portion (hereinafter referred to as a shell) having different net magnetic characteristics and which cooperate to form an extremely effective two domain magnetic device.

An embodiment of such a two domain magnetic device 10 is shown schematically in FIG. 1 and comprises a drawn wire 11 of a suitable ferromagnetic material having a generally circular cross section. It is preferred that the wire has a true round cross section or as close to true round as can be reasonably obtained. The magnetic wire 11 may, for example, be 36 inches long, have a diameter of one thirty-second of an inch and may be made of a commercially available wire alloy having 70 percent nickel, 4 percent chrome and 26 percent iron. The wire was processed to form a relatively "hard" magnetic wire shell 12 having relatively high magnetic coercivity and a relatively "soft" magnetic wire core 14 having relatively low magnetic coercivity. It is generally known that the coercivity of the magnetic materials increases with the hardness of the specimen. The usual procedure for providing the required hardness is to slightly stretch the material. In this invention, the magnetic material is twisted about its longitudinal axis rather than stretched longitudinally. As a result of the twisting, the outer walls are stretched to provide a desired hardness while the center of the wire is virtually unaffected. Two separate conditions of coercivity will exist forming one domain adjacent the periphery of the wire and a second domain adjacent to the central axis of the wire. The processing included annealing the wire to total softness and then stretching the wire about 5 percent of its length to orient all magnetic domains into linear position. The wire was then twisted counterclockwise to about 16 turns per inch. This provided an outside angle of about 35 degrees and an inside angle close to 0 degrees. The hardness of the outer surface produced by twisting provides about 25 times greater hardness than would have resulted from hardness produced in the usual stretching manner.

The term "coercivity" is used herein in its traditional sense to indicate the magnitude of the external magnetic field necessary to bring the net magnetization of a magnetized sample of ferromagnetic material to zero.

The relatively "soft" core is magnetically anistropic with an easy access of magnetization substantially parallel to the axis of the wire 11. The relatively "hard" shell is also magnetically anistropic with any easy access of magnetization substantially parallel to the axis of the wire.

Before turning to a specific embodiment or structure utilizing the magnetic device 10 of this invention, it is believed that it will be helpful to describe the magnetic phenomenum occuring in the wire 11 formed as described above. Turning first to FIG. 1, there is illustrated a wire 11 processed to have a relatively hard magnetic shell 12 and a relatively soft magnetic core 14. In the state shown in FIG. 1, the wire 11 has not been magnetized and is in a magnetically neutral state wherein the electron moments (those that are magnetically effective) are oriented with sufficient randomness so that the vectorial sum for the wire volume approximates zero. FIG. 2 illustrates the wire 11 at a time when it is subjected to a charging magnetic field such as is caused by passing a unidirectional current through a wire 16 coiled around the wire 11. During the passage of this current through the wire 16, the magnetic moments in the shell 12 and the core 14 are oriented with a preference in the same particular direction, the direction being determined by the polarity of the current passing through the coil 16. As illustrated in FIG. 2, the entire wire, both shell and core, has a north pole at the right end and a south pole at the left end. This condition will be maintained as long as current is passing through the coil 16.

With the wire 11 processed as described above, as soon as current flow through the coil 16 is terminated, a short portion 18, 20 of the core 14 adjacent each of the ends 22, 23 respectively of the wire 11 have their polarities reversed due to the demagnetization field at the ends of the shell and core which is strong enough to reverse the low coercivity core but not the high coercivity shell. The net magnetization of those short portions 18, 20 of the core align themselves in an axial direction opposite to the axial direction of the net magnetization of the shell. The boundary formed between the reversed "short" portions 18, 20 of the core 14 and the remaining unreversed portion 24 of the core 14 is defined as a transverse domain wall 26.

As can be seen in FIG. 3, the core on opposite sides of the transverse domain wall 26 has the same polarity producing a repelling effect upon one another and causing a concentration of flux lines eminating outwardly from the wire 11 along a plane including the domain wall 26, some of these flux lines being shown in FIG. 3. The state of the wire illustrated in FIG. 3 can form naturally or can be induced by a magnetic domain wall device as described below.

FIRST EMBODIMENT (FIGS. 4 – 7)

Figure 4:
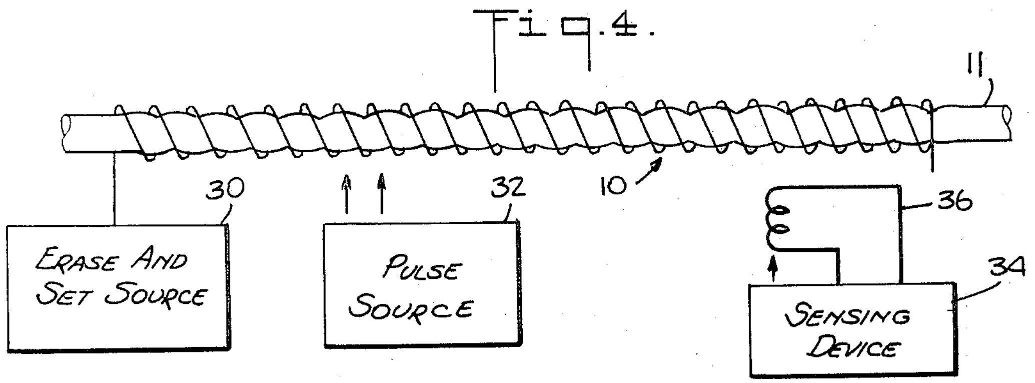
FIG. 4 shows a traveling magnetic domain wall device formed in accordance with one embodiment of this invention.

Turning now to FIG. 4, the magnetic domain wall device 10 includes the magnetic wire 11 discussed above having wound thereon various layers of the wire as will be hereinafter described. An erase and set electrical current source 30 is provided to pass current through one of the coiled wires in order to magnetize the entire wire 11 into a particular direction of magnetization. A direct current pulse source 32 provides selectively a series of pulses sequentially to a second and third set of wires coiled about the magnetic wire 11. A sensing device 34 including a coil 36 located adjacent to the magnetic wire 11 detects the presence of a changing magnetic field which will induce an electrical pulse in the coil 34 which is then transmitted to any desired utilization means (not shown).

Figure 5:
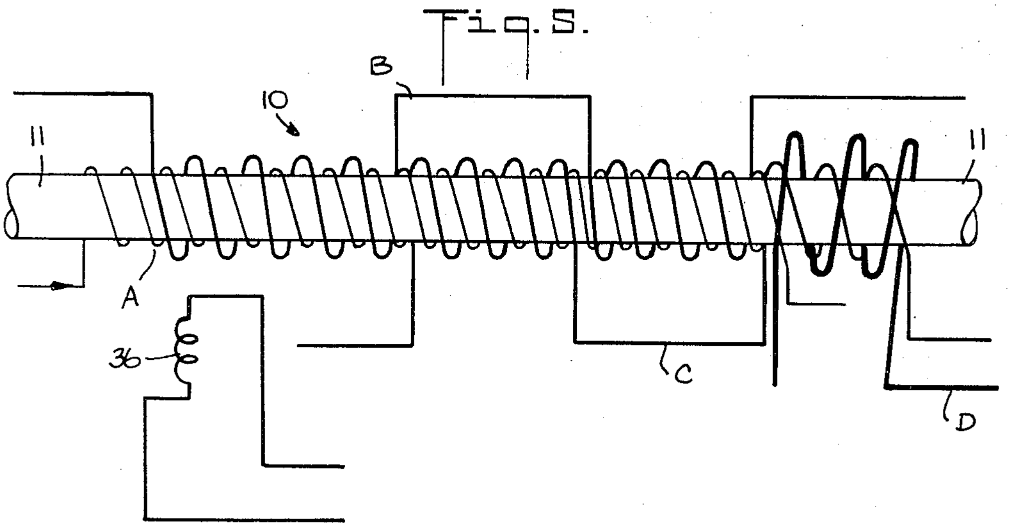
FIG. 5 is a schematic illustration of a traveling magnetic domain wall device of FIG. 4 showing various domain wall moving coils in accordance with the first embodiment of this invention.

A first coil (A) of wire is wound about the magnetic wire 11 (see FIG. 5). In one example of this embodiment a No. 36 single cotton covered copper wire was used and was wound to about 84 turns per inch in a clockwise direction. Coil A served as the erase and set coil. A second coil (B) was wound about the wire 11 as a set of interconnected individual sections (FIG. 5) wherein each section was about 1 inch long, contained 100 turns of wire and each section was equally spaced apart from the adjacent section. The end sections of the coil B were placed about 1 inch from the end of the magnetic wire 11. The second coil was also wound in a clockwise direction.

A third coil (C) was wound about the wire 11 as a set of individual interconnected sections placed in the spacing between the sections of the B coil. The C coil also had 1 inch sections of 100 turns each, spacing of equal length and was wound clockwise (FIG. 5). On top of the first section of the endmost coil (coil C in FIG. 5) was placed an additional coil D covering a portion of the first section. In the example described herein, 25 turns were added in a clockwise direction. The coil D served as a starter coil for establishing an initial transverse domain wall across the cross section of the wire 11 adjacent the end thereof where the coil D was wound. The coils B and C served as domain wall propagating coils to propagate the domain wall along the length of the wire 11.

In order to operate the magnetic device 10, a current from the erase and set source 30 is introduced into coil A. The current should be of sufficient magnitude to eliminate any existing magnetic conditions within the wire 11 and set up a uniform magnetic alignment throughout the wire 11. In the example herein described, a positive current of approximately 400 ma successfully accomplished this. After the wire was erased and set, a small current was introduced into the same coil A in the opposite direction. The magnitude of this current must be less than the magnitude required to reverse the magnetic alignment of either the shell or core of the wire 11. In the example described, a negative current of 100 ma was introduced to the coil A. A propagation current pulse was then passed through the domain wall propagating coil having a section closest to the end of the wire 11 (in the example shown, coil C). This current must be low enough to avoid formation of the transverse domain walls along the length of the wire 11 wherever a section of coil C exists but high enough to effect longitudinal movement of a single domain wall along the length of a section of the coil C. It was found that a current of 70 ma was sufficient to move a transverse domain wall a predetermined distance along the length of the wire 11. If the initial domain wall adjacent one end of the wire 11 is not formed by passing this current through the coil C, the additional windings provided by the coil D will increase the magnetic field in the region of coil D sufficiently to establish a transverse domain wall.

The magnetic field produced by the current through the starter coil D and first section of the coil C establishes a transverse domain wall in the wire 11 at the interior end of the first section of coil D. Upon deenergization of the coil D, the domain wall remains at the position at which it was established and will remain there until coil B is energized. Passing a current through coil B of the same magnitude as was used in coil C, i.e. 70 ma, is sufficient to move the domain wall the length of the first section of the B coil but is insufficient to establish a new domain wall at the subsequent sections of the B coil. This is because the existence of the domain wall at the beginning of the first section of the B coil makes it easier to reverse the polarity of the adjacent core section. In other words, the adjacent core section, in a sense, has been prepared for reversal by the existence of the previously reversed adjacent core section. Consequently, a 70 ma current pulse sent through coil B will effect reversal of the core portion corresponding to the first section of the coil B and thereby move the domain wall along that first B coil section and establish a prepared region at the beginning of the second section of coil C. Subsequent energization of coil C by the same magnitude of current i.e. 70 ma, effects reversal of the core corresponding to the second C coil section. Each time a current pulse is sent through the coil whose section is next adjacent the previously reversed core portion, the set condition of the core corresponding to that coil section will be reversed thereby moving the domain wall in a stepped sequential movement along the length of the wire 11. Ultimately the entire core 14 of the wire 11 will have a polarity reversed from that of the shell 12 thereby providing a magnetic return path of shunt for the shell through the core.

During the period of reversal of a portion of the core, or in other words, during the movement of the transverse domain wall along a predetermined portion of the wire 11, the magnetic field surrounding that portion of the wire 11 where the core reversal takes place changes materially in magnitude and rapidly in time. The result is that an appropriately placed pick up coil 36 will detect (read) the core reversal through generation of an electrical pulse in the pick up coil. In order to detect the arrival of the domain wall at a particular location along the length of the wire 11, a pick up coil 36 is placed adjacent to that particular location. The location of the pick up coil 36 is dependent upon the number of shifts of the domain wall desired or the number of input pulses to be counted before a pick up signal is induced in the coil 36 and utilized. The number of shifts is equal to the number of pulses sent into the coils B and C. Since each shift represents a one inch movement because the length of each section of the coils B and C is 1 inch, by knowing the number of shifts desired, the total length of magnetic wire needed is easily computed and the pick up coil 36 is placed at that location.

Figure 6:
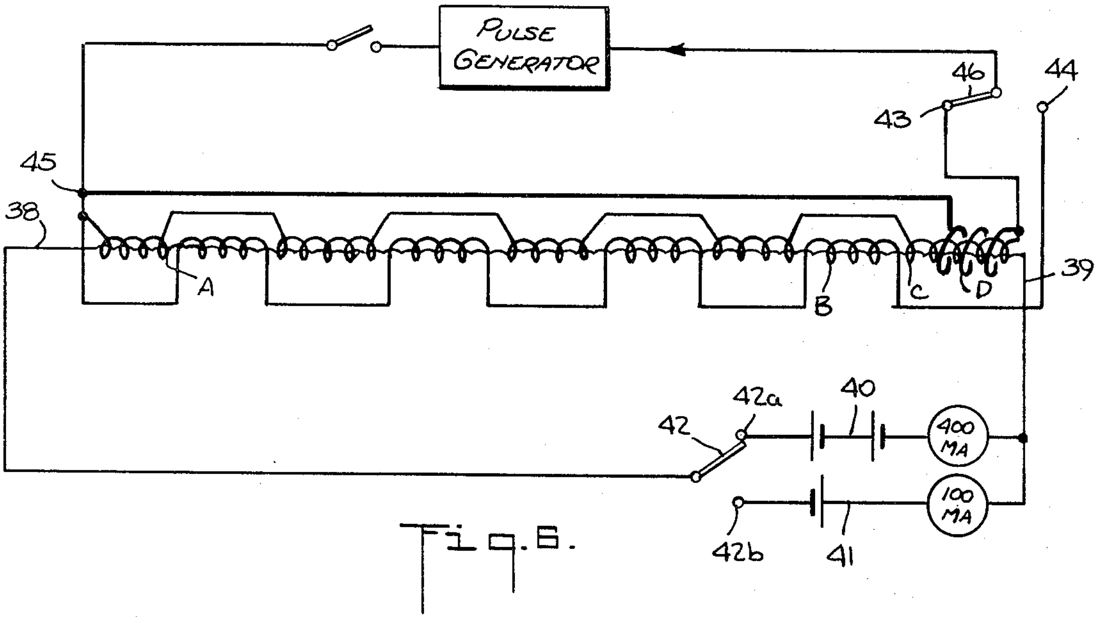
FIG. 6 is a circuit diagram showing the electrical connections between power sources for the traveling magnetic domain wall device of FIG. 4.

FIG. 6 shows a typical electrical circuit for providing the required current to the various coils. As described above, the wire 11 has an erase and set coil A, domain wall propagation coils B and C and starter coil D wound thereon. Connected across the ends 38, 39 of coil A is a 12 volt source 40 and 1.5 volt source 41 of opposite polarity to volt source 40. Switch 42, in series with coil A, permits selective energization of coil A by either source 40 or 41 when in positions 42*a* and 42*b* respectively. Source 40 provides 400 ma current to coil A and source 41 provides 100 ma current to coil A. Initially, switch 42 is placed into position 42*a* in order to erase and set the wire 11. Then switch 42 is switched to position 42*b* so that the 100 ma current is passed through coil A in order to precondition the core to permit reversal of sections of the core without the need for a high current.

One end of coil C is connected to a terminal 43 of a double pole switch 46. One end of coil B is connected to a terminal 44 of the double pole switch 46. The other end of the coils B and C are jointly connected at contact point 45 which is in series with an electrical source 47 capable of producing electrical pulses (pulse generator) and the double pole switch 46. Coil D is connected in series between the terminal 43 and coil C.

When the double pole switch is in position so that it contacts terminal 43, the current source 47 provides a 70 ma pulse through the coils C and D to either establish a domain wall at the end of the wire adjacent the starter coil D or to move the domain wall along one section of the coil C. When the switch 46 is in contact with the terminal 44, the current pulses flow through coil B causing the domain wall to move along the wire 11 for a section of the coil B. Alternating the switch between terminals 43 and 44 moves the domain wall in sequential steps along the wire 11. The movement of the double pole switch 46 can be controlled by any known mechanism including a clock pulse, a card reader or other alternative device.

Figure 7:
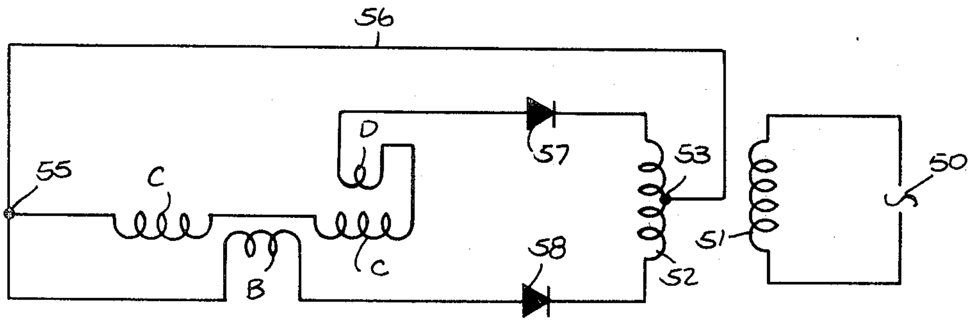
FIG. 7 is an alternative circuit diagram to the diagram of FIG. 6 employing an alternating current source.

FIG. 7 shows an alternative embodiment of an electrical circuit of a control device for the B and C coils using an AC source 50. The primary winding 51 of a transformer is connected in series with the AC source 50. The secondary winding 52 has one end thereof connected to one end of the coil B and the other end thereof connected to one end of the coil C. The secondary is tapped at its midpoint 53 and lead 56 connects the midpoint 53 to the opposite end of the coils B and C at the junction 55. Coil D is connected in series between the secondary 53 and the coil C. Diodes 54 and 55 are placed in series, respectively, with coils B and C to insure proper direction of current flow through these coils.

This circuit will provide one-half cycle through coil B and the other half cycle through coil C. The frequency of the shifting will then depend within limits upon the frequency of the AC source 50. By suitably increasing the source frequency a high speed shift register or counter can be provided. The upper frequency limit for the example above is around 4,000 cycles per second.

SECOND EMBODIMENT (FIG. 8)

A simpified form of traveling magnetic domain wall device 60 comprises a wire 62 specially processed to form a relatively "hard" magnetic shell 64 and a relatively "soft" magnetic core 66 throughout the length of the wire 62. For example, a 20 inch length of 10 mil (0.010 inch) diameter wire of a commercially available wire alloy having 48 percent iron and 52 percent nickle is work hardened at room temperature by stretching the wire slightly (e.g. approximately 2½%) and thereafter circumferentially straining the wire. The circumferential straining step can be performed by twisting the wire back and forth preferably not retaining a permanent twist. It has been found that good results were obtained by twisting the wire ten turns per linear inch of wire in one direction and then untwisting the wire the same amoung in the opposite direction.

An electronically conductive wire, such as No. 36 copper wire, is wound around the specially processed wire 62 to form a coil 68. It has been found that a rate of winding of 180 turns per inch from one end of the wire 62 to the other provides a suitable coil 68. The coil 68 may be connected alternately to one of two electrical current sources of opposite polarity and of different magnitude by means of a double pole switch 70. A first current source 72 of approximately 400 ma serves as an erase and set (or charge) current source and a second source 74 of substantially smaller magnitude (approximately 40 ma) serves as a transverse domain wall propagating current source.

The domain wall device 60 is operated by initially connecting the charging current source 72 to the coil 68 in order to establish a unidirectional magnetic field within the wire 62 as shown in FIG. 2. With a 400 ma charge, the time duration required to charge the wire is momentary. When the coil 68 is deenergized two transverse domain walls establish themselves naturally, one adjacent each end of the wire 62. For the wire described above, it is found that the domain walls establish themselves approximately three-eighths of an inch inwardly from each end of the wire.

In order to move the transverse domain walls toward the center of the wire 62, the switch 70 is moved to connect the domain wall propagating current source 74 to the coil 68. The source 74 provides a series of pulses of a polarity opposite to the charging current. If the source 74 provided a series of pulses having the same polarity as, but of smaller magnitude than, the charging current the domain wall will propagate in a reverse direction, i.e. toward the end of the device 60. This enables complete control of the location and movement of the transverse domain wall. The distance that the domain wall moves along the wire 62 for each pulse is a function of the magnitude of the pulse, the time duration of the pulse, the size of the wire 62 and the coercivity of the core.

The movement of the transverse domain wall along the wire actually is a reversal of the magnetic polarity of that portion of the core immediately adjacent to the domain wall which has the same polarity alignment as the shell 64. This polarity reversal occurs very rapidly and materially changes the magnetic field external to the shell in the immediate vicinity of the section of the core whose polarity changes. For a given domain wall propagation pulse, the domain wall moves the same distance each time a pulse is transmitted through the coil 68. Because of this consistency in movement of the domain wall, knowing the characteristics of the propagation pulse, an accurate calculation can be made as to the distance that a domain wall moves and the time it will take to reach a particular point along the wire.

THIRD EMBODIMENT (FIG. 9)

Figure 8:
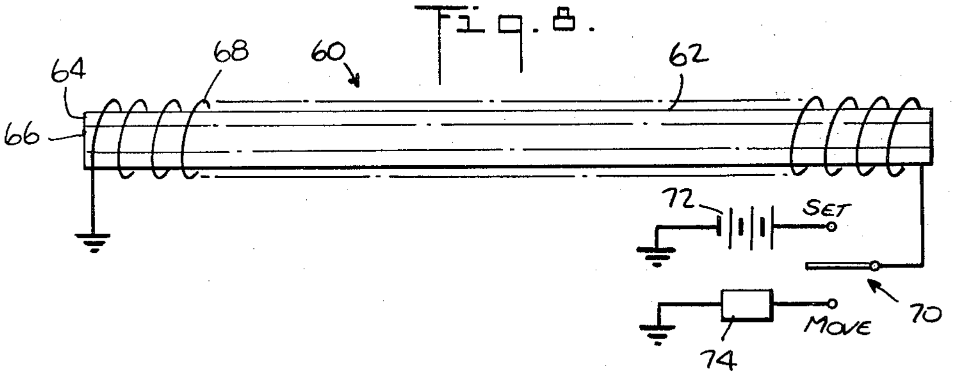
FIG. 8 is a schematic illustration of a traveling magnetic domain wall device formed in accordance with a second embodiment of this invention.

In the second embodiment described above and illustrated in FIG. 8, a transverse domain wall naturally formed itself adjacent each end of the wire 62. When the wire 62 was subjected to domain wall propagating pulses through the coil 68, both domain walls moved toward the center of the wire at the same speed. When the domain walls meet, the entire core has reversed its polarity and the transverse domain walls become nonexistent. Consequently, the effective total movement of each domain wall is one-half the length of the wire. In the third embodiment 80 of this invention (FIG. 9), the wire is processed further so that a transverse domain wall forms at only one end of the wire and that domain wall is caused to move the entire length of the wire.

A wire 82 is processed as described above in order to form therein a relatively "hard" magnetic shell and a relatively "soft" magnetic core. Adjacent one end 84 of the wire 82 at a position inwardly from and contiguous to the naturally formed domain wall (for the wire described above three-eighths inch in from the end 84) the wire is treated to prevent movement of that domain wall toward the center of the wire 82. This is accomplished by work hardening a zone 86 contiguous to the domain wall so that the core in that zone 86 has a substantially greater hardness and, therefore, a substantially greater coercivity than the core throughout the remainder of the wire. This can be accomplished by compressing the wire in the zone 86 to approximately 80 percent of the wire diameter. Such work hardening prevents the core portion in the zone 86 from reversing its polarity relative to the shell. Consequently, the transverse domain wall adjacent to the zone 86 will not be able to traverse the zone and will remain at the end 84 of the wire 82.

A similar result can be obtained by creating the work hardened zone to encompass the entire area from the end of the wire inwardly to approximately the point where the transverse domain wall would form if the zone were not present.

The results of work hardening one end of the wire is that the only transverse domain wall which is capable of traveling through the wire 82 is the domain wall naturally formed at the opposite end 88 of the wire. That domain wall is now free to traverse from the end 88 adjacent which it is formed through the length of wire until it reaches the work hardened zone 86.

FOURTH EMBODIMENT (FIG. 10)

Figure 9:
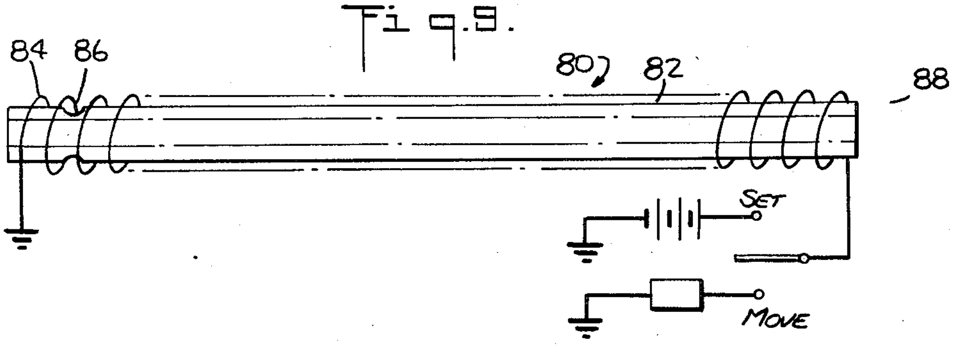
FIG. 9 is a schematic illustration of a traveling magnetic domain wall device formed in accordance with a third embodiment of this invention.

In the third embodiment illustrated in FIG. 9, a work hardening zone 86 was employed at one end of the wire 82 to prevent movement of a transverse domain wall at that end 84 of the wire thereby producing a traveling domain wall device 80 in which only a single transverse domain wall traversed the wire. In the fourth embodiment illustrated in FIG. 10, a traveling domain wall device 90 is constructed to permit the formation and propagation of more than one transverse domain wall. In fact, in the specific construction illustrated in FIG. 10, it is possible to have four or more transverse domain walls formed and propagated and controlled such that the extent of propagation of each such transverse domain wall is constrained within specific predetermined limits.

Figure 10:
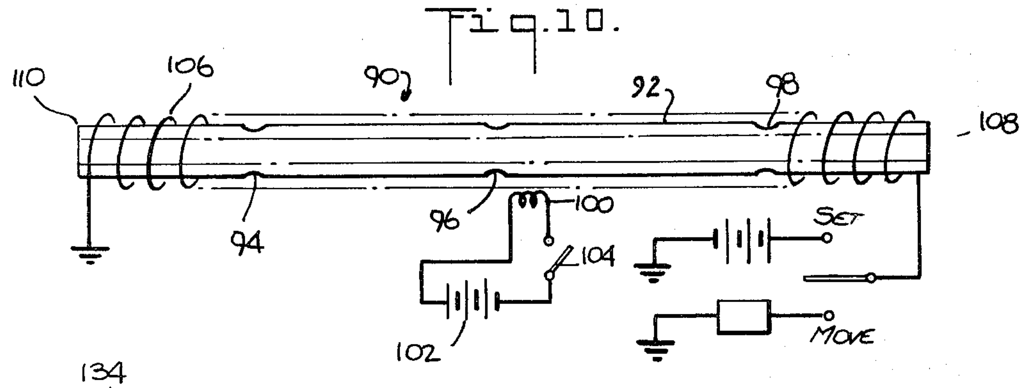
FIG. 10 is a schematic illustration of a traveling magnetic domain wall device formed in accordance with a fourth embodiment of this invention wherein several transverse domain walls can be propagated for predetermined distances simultaneously.

A wire 92 processed as described above with respect to the second embodiment is further processed to form three work hardened zones 94, 96, 98 spaced apart from one another and spaced apart from the ends of the wire 92. A transverse domain wall will establish itself at each end of the wire upon termination of charging the wire in the same manner as described above with respect to the second embodiment. Additional transverse domain walls can be formed at any given point along the length of the wire 92 by the application at that point of an external magnetic field of sufficient magnitude and of a polarity opposite to the charging magnetic field polarity. This external magnetic field can be supplied by passing a current through a coil which is located adjacent to the point where a transverse domain wall is desired to be established. For example, as shown in FIG. 10, such a coil 100 is located adjacent to the right hand side of the work hardened zone 96. The coil is in series with a transverse domain wall inducing electrical source 102 and a switch 104. Energization of the coil will induce a transverse domain wall immediately adjacent the work hardened zone 96 thereby resulting in three transverse domain walls, the two formed at the ends of the wire and the induced domain wall formed adjacent to the zone 96. By that same procedure, other domain walls may be formed in the wire 92, such as at positions adjacent to each of the other work hardened zones 94, 98.

When a transverse domain wall propagating pulse is passed through the coil 106 wound about the entire wire 92, each of the transverse domain walls is moved and the direction of movement is dependent upon the location of the domain wall. The domain wall which is formed adjacent to the end 108 will move toward the zone 98, the domain wall which is formed adjacent to the wire end 110 will move toward the zone 94 and the wall which is formed immediately adjacent to the right hand side of the zone 96 will move toward the zone 98. By having pickup coils (not shown) placed at various points along the wire, signals will be received at times dependent upon the distance of those pickup coils from the initial position of the transverse domain walls.

FIFTH EMBODIMENT (FIG. 11)

Figure 11:
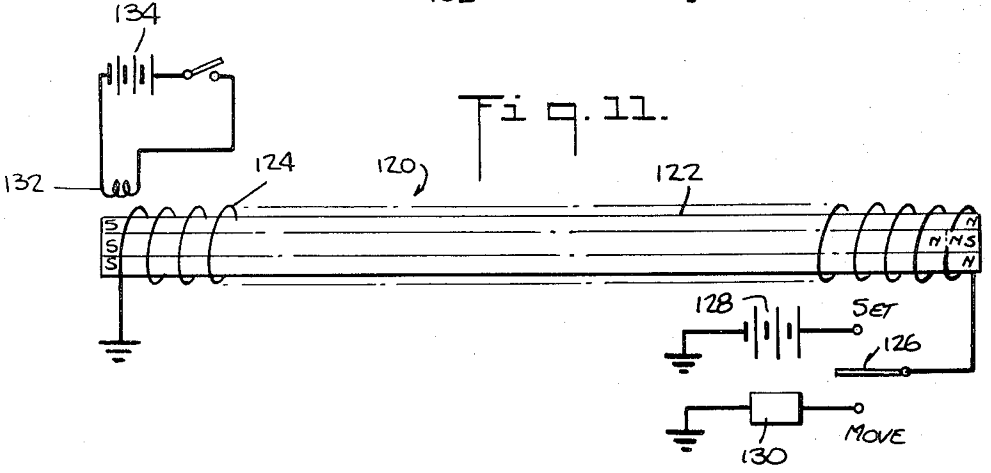
FIG. 11 is a schematic illustration of a traveling magnetic domain wall device formed in accordance with a fifth embodiment of this invention.

In the third embodiment described above, and illustrated in FIG. 9, a work hardened zone 86 is formed contiguous to a transverse domain wall in order to prevent that domain wall from being propagated along the length of the wire. The work hardened zone effectively prevents propagation of the transverse domain wall because the coercivity of the core in that zone is high enough to prevent the propagation pulse from being able to reverse the polarity of the core in the zone. An alternative embodiment 120 for preventing reversal of the polarity of a portion of the core is shown in FIG. 11. A two domain magnetic wire 122 has a coil 124 wound thereabout which is connected through a double pole switch 126 to a charging (set) current source 128 or a propagation current source 130. A second coil 132 is located adjacent to a section of the wire 122 where it is desired to prevent a transverse domain wall from forming. The coil 132 is connected to a current source 134 which induces a magnetic field having the same direction as the magnetic field induced by the charging current source 128. The second coil 132 applies an external magnetic field having a direction of magnetization such that it will tend to maintain the polarity of the core the same as that of the shell. As long as this external magnetic field is of sufficient magnitude to overcome the core demagnetization effect of the shell and core and of the magnetic field resulting from passage of current through the domain wall propagating coil 124, the portion of the core subjected to the external magnetic field will not reverse its polarity. The failure to have this polarity reversed will prevent the formation of a transverse domain wall in that zone and will bar propagation through that zone of a transverse domain wall formed elsewhere in the wire. polarity Consequently, if it is desired to have a domain wall formed at only one end of the wire 122, an external magnetic field can be applied to the other end of the wire of the proper oolarity and magnitude to prevent formation of the domain wall at that other end. Instead of using a coil 132, this external magnetic field also can be formed by a permanent magnet.

SUMMARY

It can be seen from the above that this invention provides a traveling magnetic domain wall device which can be easily mass produced at relatively low cost. In its preferred form as a wire, the device can be easily handled. Since the charging current magnitude and transverse domain wall moving current magnitude are effective within wide ranges of tolerance, the energy levels required to form and propagate the transverse domain wall are not critical and the input sources need not be or precise construction or under precise control. By selection of appropriate material for forming the magnetic device, the difference in coercivity between the shell and coil can be substantial thereby allowing the demagnetization field to reverse the polarity of a portion of the core but not the shell. If the core coercivity is low, a relatively low energy input of proper direction will reverse the direction of magnetization of sequential portions of the core, thereby moving the domain wall along the length of the wire. Because this reversal of magnetization direction for each core portion occurs in a very short time interval, the magnetic field external to the traveling magnetic domain wall device will change rapidly resulting in the inducing of an output signal of substantial magnitude in a pickup coil. The ability to be able to induce a transverse domain wall anywhere along the length of the wire, to propagate it in opposite directions, and to prevent formation or propagation of a domain wall in the wire core by preventing reversal of magnetization direction of a portion of the core permits wide application of the traveling magnetic domain wall device of this invention.

What is claimed as new and desired to be secured by Letters Patent of the United States is:

1. A magnetic device comprising:

a first portion having a predetermined magnetic property;

a second portion having said predetermined magnetic property, the magnitude which is substantially different than said predetermined magnetic property of said first portion;

said first and second portions being capable of retaining net magnetization after being subjected to a magnetic field;

a first domain wall between said first and at least a section of said second portion when said first portion has a net magnetization in a first direction and said section of said second portion has a net magnetization in a second direction substantially opposite from said first direction, and a second domain wall between said section and the remainder of said second portion.

2. The device of claim 1 wherein one magnetic property having substantially different magnitudes as between said portions is coercivity.

3. The device of claim 1 wherein said portions are contiguous.

4. The device of claim 1 wherein said first portion is a permanent magnet.

5. The device of claim 1 wherein said section of the second portion immediately obtains a net magnetization in said second direction upon termination of the subjection of said device to an external magnetic field, the direction of magnetization of said external field being in said second direction and inducing a net magnetization in said first portion in said first direction.

6. A magnetic device comprising: a first magnetic portion, and a second magnetic portion, the magnitude of at least one of the magnetic properties of said first portion being substantially different than the magnitude of the corresponding magnetic property of said second portion, said first and second portions having a net magnetization in a first direction when subjected to a first external magnetic field having a second direction substantially opposite to said first direction, said first portion having a net magnetization in said first direction and a first section of the second portion having a net magnetization in said second direction upon termination of said first external magnetic field, and said first section being separated from the first portion by a first domain wall and said first section being separated from the remainder of said second portion by a second domain wall transverse to said first domain wall.

7. The device of claim 6 wherein a second second of said second portion has a net magnetization in said second direction, said second second being spaced from said first second, said second second being separated from said first portion by a third domain wall and said second portion being separated from the remainder of said second domain by a fourth domain wall transverse to said third domain wall.

8. The device of claim 6 including means for subjecting at least a second section of the second portion to a second magnetic field having the same direction of magnetization as said first magnetic field.

9. The device of claim 6 wherein the direction of net magnetization of said section reverses from said first direction to said second direction immediately upon termination of subjecting said device to said first magnetic field.

10. The device of claim 9 wherein the volume of said section increases when the magnetic device is subjected to a second magnetic field having a direction opposite to said first magnetic field and having a magnitude greater than a predetermined amount.

11. The device of claim 6 wherein one magnetic property having substantially different magnitudes as between said portions is coercivity and wherein the coercivity of said first portion is substantially greater than the coercivity of said second portion.

12. The device of claim 11 wherein the coercivity of a second section of the second portion is substantially greater than the coercivity of the remainder of said second portion.

13. A magnetic wire device comprising:

a shell constituting a first magnetic portion, and a core constituting a second magnetic portion, the coercivity of said shell being substantially greater than the coercivity of said core, said shell having a net magnetization in a first direction, a section of said core having a net magnetization in a second direction opposite from said first direction and the remainder of said core having a net magnetization in said first direction, said section of said core being separated from the shell by a longitudinal first domain wall and said section of the core being separated from the remainder of the core by a second domain wall transverse to said first domain wall.

14. The device of claim 13 wherein a second section of said core has a net magnetization in said second direction, said second section being located at one end of said device and said first portion being located at the opposite end of said device, said second section being separated from said shell by a longitudinal third domain wall and said second section being separated from the remainder of the core by a fourth domain wall transverse to said third domain wall.

15. The device of claim 13 wherein the coercivity of a second section of the core is substantially greater than the coercivity of the remainder of the core.

16. The device of claim 13 wherein said transverse domain wall forms adjacent one end of the device immediately upon termination of subjecting said device to a first magnetic field.

17. The device of claim 16 wherein the transverse domain wall moves toward the longitudinal center of said device upon the device being subjected to a second magnetic field having a polarity opposite to said first magnetic field and a magnitude greater than a predetermined amount.

18. The device of claim 16 wherein the transverse domain wall is shifted along the length of said device upon the device being subjected to a second magnetic field having a polarity opposite to said first magnetic field and a magnitude greater than a predetermined amount.

19. The device of claim 16 including means for subjecting at least a second section of the core to a second magnetic field having the same polarity as said first magnetic field and wherein said second magnetic field is of sufficient magnitude to prevent said second portion of the core from obtaining a net magnetization in said second direction when said device is not subjected to said first magnetic field.

20. The device of claim 16 including means for subjecting at least a second section of the core to a third magnetic field having the same polarity as said first magnetic field and wherein said third magnetic field is of sufficient magnitude to prevent said second section of the core from obtaining a net magnetization in said second direction when said device is subjected to said second magnetic field.

* * * * *

UNITED STATES PATENT OFFICE

CERTIFICATE OF CORRECTION

Patent No. 3,818,465 Dated June 18, 1974

Inventor(s) John R. Wiegand

It is certified that error appears in the above-identified patent and that said Letters Patent are hereby corrected as shown below:

Column 6, line 36 - "path of" should read "path or"
Column 6, line 47 - "longth" should read "length"
Column 8, line 5 - "amoung" should read "amount"
Column 11, line 2 - omit the word "polarity"
Column 11, line 6 - "oolarity" should read "polarity"
Column 11, line 21 - "be or" should read "be of"

Column 12, Claim 7 should read as follows:
--7. The device of claim 6 wherein a second section of said second portion has a net magnetization in said second direction, said second section being spaced from said first section, said second section being separated from said first portion by a third domain wall and said second section being separated from the remainder of said second domain by a fourth domain wall transverse to said third domain wall.--

Column 13, Claim 14, line 9 - "portion" should read "section"
Column 14, Claim 19, lines 13-14 - "portion" should read "section"
Column 14, Claim 20, line 17 - "16" should read "18"

Signed and sealed this 3rd day of December 1974.

(SEAL)
Attest:

McCOY M. GIBSON JR.
Attesting Officer

C. MARSHALL DANN
Commissioner of Patents

USCOMM-DC 60376-P69
☆ U.S. GOVERNMENT PRINTING OFFICE : 1969 O—366-334